US011159099B2

(12) United States Patent
Södö et al.

(10) Patent No.: US 11,159,099 B2
(45) Date of Patent: Oct. 26, 2021

(54) METHOD FOR PULSE-WIDTH MODULATION OF A POWER CONVERTER AND A POWER CONVERTER

(71) Applicant: Vacon Oy, Vaasa (FI)

(72) Inventors: Nicklas Södö, Nordborg (DK); Oskari Leppäaho, Nordborg (DK); Simo Häkli, Nordborg (DK)

(73) Assignee: Vacon Oy, Vaasa (FI)

( * ) Notice: Subject to any disclaimer, the term of this patent is extended or adjusted under 35 U.S.C. 154(b) by 0 days.

(21) Appl. No.: 16/975,179

(22) PCT Filed: Mar. 21, 2018

(86) PCT No.: PCT/FI2018/050210
§ 371 (c)(1),
(2) Date: Aug. 24, 2020

(87) PCT Pub. No.: WO2019/180299
PCT Pub. Date: Sep. 26, 2019

(65) Prior Publication Data
US 2021/0083598 A1    Mar. 18, 2021

(51) Int. Cl.
*H02M 1/12* (2006.01)
*H02M 7/5387* (2007.01)

(52) U.S. Cl.
CPC ....... *H02M 7/53875* (2013.01); *H02M 1/126* (2013.01); *H02M 1/123* (2021.05); *H02M 7/53876* (2021.05)

(58) Field of Classification Search
CPC .. H02M 1/12; H02M 1/126; H02M 2001/123; H02M 7/219; H02M 7/5395; H02M 2007/53876; H02M 7/5387; H02M 7/53875

See application file for complete search history.

(56) References Cited

U.S. PATENT DOCUMENTS

| 6,023,417 | A | 2/2000 | Hava et al. |
| 6,819,078 | B2 | 11/2004 | Ho |
| 7,723,946 | B2 | 5/2010 | Welchko et al. |
| 7,969,106 | B2 | 6/2011 | Kitanaka |
| 8,100,799 | B2 | 1/2012 | Welchko et al. |
| 10,720,772 | B2 * | 7/2020 | Sodo ............... H02M 5/4585 |
| 2014/0334206 | A1 * | 11/2014 | Valiani ............. H02M 7/537 363/97 |
| 2015/0280619 | A1 | 10/2015 | Marohl et al. |

OTHER PUBLICATIONS

International Search Report for Serial No. PCT/FI2018/050210 dated Oct. 23, 2018.

(Continued)

*Primary Examiner* — Adolf D Berhane
(74) *Attorney, Agent, or Firm* — McCormick, Paulding & Huber PLLC (57) ABSTRACT

A method for pulse-width modulation of a power converter (10) and a power converter (10) are presented. The method comprises determining (110) a modulation index, selecting (120), based on the modulation index, a modulation technique from a plurality of pre-deter-mined modulation techniques, and modulating (130) an output (16) of the power converter (10) by utilizing the selected modulation technique.

19 Claims, 5 Drawing Sheets

(56) References Cited

OTHER PUBLICATIONS

Dong Jiang, et al., "PWM Impact on CM Noise and AC CM Choke for Variable-Speed Motor Drives", IEEE Transactions on Industry Applications, vol. 49, No. 2, Mar./Apr. 2013, pp. 963-972.
Simon Wall, et al., "High-efficiency PV inverter with SiC technology", IET Renewable Power Generation, IET Journals, 2018, vol. 12, Issue 2, pp. 149-156.

* cited by examiner

METHOD FOR PULSE-WIDTH MODULATION OF A POWER CONVERTER AND A POWER CONVERTER

CROSS-REFERENCE TO RELATED APPLICATIONS

This application is a National Stage application of International Patent Application No. PCT/FI2018/050210, filed on Mar. 21, 2018, which is hereby incorporated by reference in its entirety.

TECHNICAL FIELD

The present invention concerns in general the technical field of controlling the operation of power converters. Especially, however, not exclusively, the present invention concerns a pulse-width modulation technique of a power converter such as an inverter.

BACKGROUND

It is known to use filters that filter both the common (CM) and differential mode (DM) voltages so that phase voltage and phase-to-phase voltage waveforms become essentially sinusoidal. Such filters are known as all pole sine filters, all cure filters or DM+CM sine filters. These filters make the drive more insensitive to installation parameters and enables, for example, the use of ultra-long motor cables and provides good performance in earth fault situations of an electrical grid. They also protect sensitive equipment, such as batteries, that can be connected to the DC (direct current)-link and increase the life time of the motor isolations and bearings.

A two-level inverter produces a large CM voltage component that depends on the modulation method. The CM filtering is expensive and, therefore, every volt that has to be filtered incurs costs. Typical modulation methods, e.g. Space vector pulse-width modulation (SVPWM) produces a very large CM voltage leading to an expensive filter. A CM filter with a choke with large inductance further means bigger volume, more heat generation and higher cost.

Thus, there is still a need to develop solutions for affecting the characteristics of the CM voltage produced by power converters in order to, for example, use smaller and less expensive CM filters.

SUMMARY

An objective of the present invention is to provide a method for pulse-width modulation of a power converter and a power converter. Another objective of the present invention is that by the method the characteristics of the CM voltage produced during the operation of the power converter can be affected.

The objectives of the present invention are reached by the method and the power converter as defined by the respective independent claims.

According to a first aspect, a method for pulse-width modulation of a power converter is provided. The method comprises determining a modulation index, selecting, based on the modulation index, a modulation technique from a plurality of pre-determined modulation techniques, and modulating an output of the power converter by utilizing the selected modulation technique. The output of the power converter may be, for example, an output voltage of the power converter.

The power converter may be a two-level three-phase inverter, such as a voltage source inverter.

The method may comprise modulating said output by utilizing at least a first modulation technique and a second modulation technique depending on the modulation index.

In an embodiment, the method may comprise determining a first modulation index threshold value, and selecting the modulation technique based on comparing the modulation index to the first modulation index threshold value.

The method may comprise selecting the modulation technique to be a first modulation technique, if the modulation index is higher than or equal to the first modulation index threshold value, or, selecting the modulation technique to be a second modulation technique, if the modulation index is less than the first modulation index threshold value.

The plurality of pre-determined modulation techniques may include at least two techniques from: Space vector pulse-width modulation (SVPWM), Discontinuous pulse-width modulation minimum ($DPWM_{MIN}$), Discontinuous pulse-width modulation maximum ($DPWM_{MAX}$), Symmetric discontinuous pulse-width modulation ($DPWM_{SYM}$).

The method may comprise selecting the SVPWM, if the modulation index is higher than or equal to the first modulation index threshold value, and selecting the $DPWM_{MIN}$ or the $DPWM_{MAX}$, if the modulation index is less than the first modulation index threshold value.

The first modulation index threshold value may range from 0.4 to 0.6, advantageously 0.5.

In another embodiment, the method may comprise determining a first modulation index threshold value and a second modulation index threshold value, and selecting the modulation technique based on the first and the second modulation index threshold values.

The first modulation index threshold value may be higher than the second modulation index threshold value, and the method may comprise selecting the modulation technique to be a first modulation technique, if the modulation index is higher than or equal to the first modulation index threshold value, selecting the modulation technique to be a second modulation technique, if the modulation index is smaller than the first modulation index threshold value, and higher than or equal to the second modulation index threshold value, and selecting the modulation technique to be a third modulation technique, if the modulation index is smaller than the second modulation index threshold value. The first modulation technique may be the $DPWM_{SYM}$, the second modulation technique is the SVPWM, and the third modulation technique is the $DPWM_{MIN}$ or the $DPWM_{MAX}$. The first modulation index threshold value may range from 0.8 to 1.0, advantageously 0.9, and the second modulation index threshold value may range from 0.4 to 0.6, advantageously 0.5. The $DPWM_{SYM}$ may further be used in overmodulation conditions.

The method may, alternatively or in addition, comprise adjusting portion of one of negative null vector time and positive null vector time with respect to the other of the positive null vector time and negative null vector time of SVPWM, respectively, based on the modulation index.

The method may comprise modulating said output of the power converter by utilizing SVPWM having said portions of negative and positive null vector times substantially equal at a first modulation index, and modulating said output of the power converter by utilizing SVPWM, wherein said portions of negative null vector time and positive null vector time are adjusted relative to each other as a function of modulation index.

The method may comprise gradually increasing said portion of negative null vector time with respect to said portion of positive null vector time as a function of modulation index for decreasing magnetic flux of an inductor of a common mode filter. Alternatively or in addition, the method may comprise gradually increasing said portion of positive null vector time with respect to said portion of negative null vector time as a function of modulation index for decreasing magnetic flux of the inductor of the common mode filter.

The modulation index may be defined as a ratio of the amplitude of the reference signal to the amplitude of the carrier signal. This may refer, for example, to the ratio of amplitude of a reference sine wave to the amplitude of a triangle carrier signal.

According to a second aspect, a power converter is provided. The power converter comprises a controlling unit and an output of the power converter. The controlling unit is configured to perform the method according to the first aspect for modulating the output of the converter.

According to a third aspect, a controlling unit for pulse-width modulation of a power converter is provided. The controlling unit may comprise at least one processor, and at least one memory storing at least one portion of computer program code, and wherein the at least one processor is configured to cause the controlling unit to perform the method according to the first aspect.

According to a fourth aspect, a computer program product for pulse-width modulation of a power converter is provided. The product comprises program instructions which when executed by a controlling unit cause the controlling unit to perform the method according to the first aspect.

The utility of the present invention arises from a plurality of issues depending on the embodiment. The common mode voltage may be made lower by utilizing some of the variety of pre-determined modulation techniques at different modulation indices, that is, based on the determined modulation index. By lowering the common mode voltage, the common mode filter can be made smaller and less expensive, for instance, because of the reduced flux affecting the choke of the filter. A choke with smaller inductance further means smaller volume, less heat generation and lower cost.

The terms "first", "second", "third" and "fourth" do not denote any order, quantity, or importance, but rather are used to distinguish one element from another.

The exemplary embodiments of the present invention presented herein are not to be interpreted to pose limitations to the applicability of the appended claims. The verb "to comprise" is used herein as an open limitation that does not exclude the existence of also un-recited features. The features recited in depending claims are mutually freely combinable unless otherwise explicitly stated.

The novel features which are considered as characteristic of the present invention are set forth in particular in the appended claims. The present invention itself, however, both as to its construction and its method of operation, together with additional objectives and advantages thereof, will be best understood from the following description of specific embodiments when read in connection with the accompanying drawings.

BRIEF DESCRIPTION OF FIGURES

The embodiments of the present invention are illustrated by way of example, however, not by way of limitation in the figures of the accompanying drawings which are briefly described in the following.

DETAILED DESCRIPTION

Figure 1:
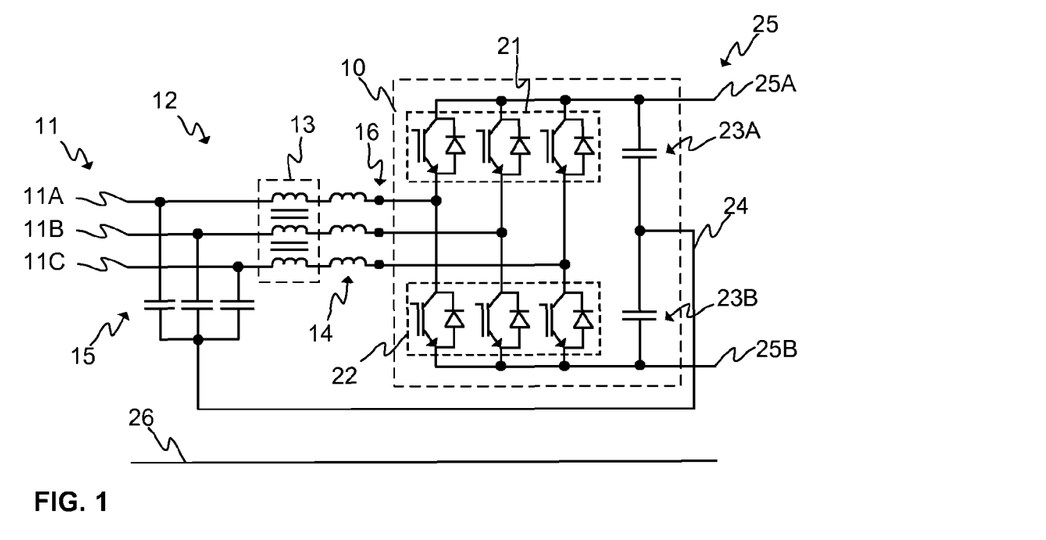
FIG. 1 illustrates schematically a power converter according to an embodiment of the present invention.

FIG. 1 illustrates schematically a power converter 10 according to an embodiment of the present invention. The power converter 10 in FIG. 1 is a two-level three-phase inverter comprising a three-phase full bridge circuit. The bridge comprises three phase legs, each comprising at least two controllable semiconductor switches, such as insulated-gate bipolar transistors (IGBTs) or silicon carbide junction gate field-effect transistors (SiC JFETs). The converter 10 further comprises input capacitors 23A, 23B, or intermediate circuit capacitors 23A, 23B in case the power converter 10 is a frequency converter. The output 16 of the converter 10 is coupled to a load 11 or an electrical grid 11, such as a multi-phase electrical grid comprising at least three phases 11A, 11B, 11C, for instance. In FIG. 1, the converter 10 may be coupled to the grid 11 via a filter 12. The filter 12 may comprise a common mode filter, such as comprising common mode chokes 13, e.g. coupled inductors, and, optionally, also inductors 14 and/or capacitors 15 for filtering differential mode currents/voltages.

It is further shown in FIG. 1 that the power converter 10 may comprise input connection means 25 for connecting a source or an electrical component, such as a rectifier bridge of a frequency converter, to the input of the power converter 10. Alternatively, there may be a DC motor or a DC power source connected to the input of the power converter 10. The power converter 10 may comprise a positive input connector 25A and a negative input connector 25B. According to various embodiments, the positive input connector 25A may be connected to the DC+ rail and the negative input connector to the DC− rail of the power converter 10. Furthermore, the power converter 10 may comprise two input or DC-link capacitors, preferably having substantially equal capacitances, and an electrical conductor 24 connected between the middle point of the input capacitors 23A, 23B and the common point or star point of the differential mode capacitors 15 of the filter 12.

The common mode voltage may be measured in the embodiment illustrated in FIG. 1 between the output 16 of the converter and the ground potential 26, or essentially between the DC− rail and the ground potential 26.

Figure 2:
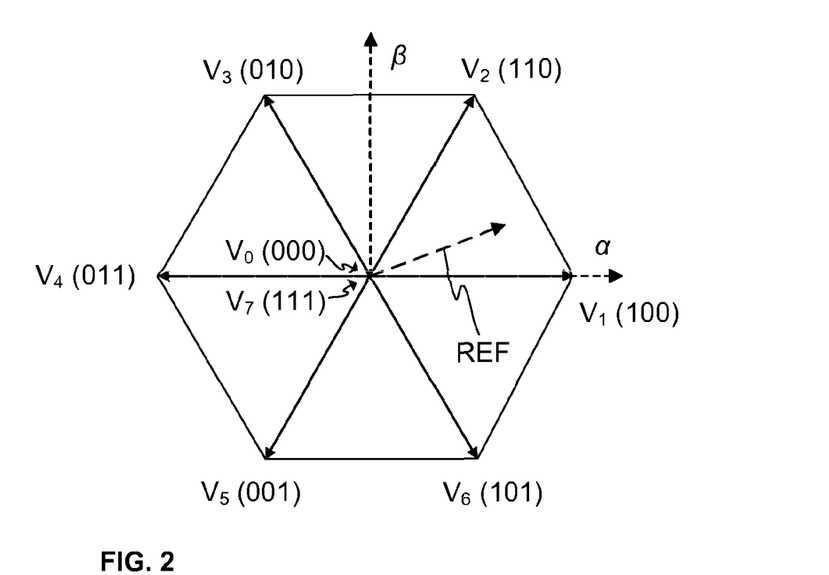
FIG. 2 illustrates schematically switching vectors of a power converter according to an embodiment of the present invention.

The controllable switches 21, 22 may be controlled by utilizing variety of techniques. The switches 21, 22 may be controlled for modulating the output 16 of the converter 10 by utilizing Space vector pulse-width modulation (SVPWM) technique as is known in the art. The switches 21, 22 shown in the embodiment of FIG. 1 should be controlled such as short-circuit the input capacitors 23A, 23B through any of the three legs. The principle of SVPWM is further shown in FIG. 2 illustrating switching vectors utilizable in SVPWM in the converter 10 of FIG. 1 as is known to a person skilled in the art. There are six active vectors $V_1$, $V_2$, $V_3$, $V_4$, $V_5$, and $V_6$, and two null vectors $V_0$ and $V_7$, that is negative and positive null vectors, respectively. The switching vectors may be defined in an $\alpha$-$\beta$ plane, that is, referring to known Clarke transformation. The active vectors define six segments and are used to produce on average the reference vector REF by using the two active vectors defining the sector in which the reference vector REF lies. The magnitude of the resulting vector can further be decreased by utilizing the null vectors.

In the example case of FIG. 2, the reference vector REF lies in the first sector. The output may thus be modulated by utilizing active vectors $V_1$ and $V_2$, and the null vectors $V_0$ and $V_7$ to decrease the magnitude of the resulting output vector. In SVPWM, the null vectors $V_0$ and $V_7$ are used with equal durations during a switching period, that is 50% and 50%, respectively, during the total null vector time period. The ones and zeroes following the switching vectors in FIG. 2, for example, $V_1$ (100), refer to the state of the controllable switches 21, 22 comprised in the bridge of the converter 10 of FIG. 1. $V_1$ may thus be produced by having the upper switch 21 of the first leg and lower switches 22 of the second and third legs in conducting states, and lower switch 22 of the first leg and upper switches 21 of the second and third legs in non-conducting states. Null vector $V_0$, that is the negative null vector (000), may be reproduced by having only the lower switches 22 of the each of the legs in conducting state. $V_7$ (111) represents the state of having only upper switches 21 of the each of the legs in conducting state.

Figure 3:
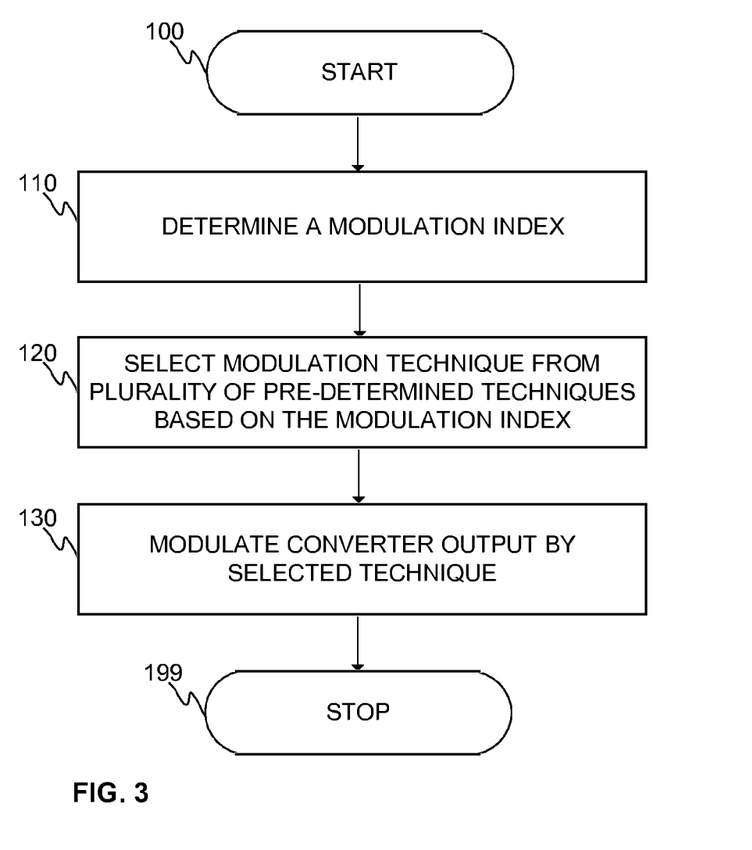
FIG. 3 illustrates a flow diagram of a method in accordance with an embodiment of the present invention.

FIG. 3 illustrates a flow diagram of a method according to an embodiment of the present invention. Step 100 refers to a start-up phase of the method. Suitable equipment and components are obtained, arranged and configured, and systems, such as a power converter and other essential connections and elements, assembled and configured for operation.

Step or item 110 refers to determining a modulation index. The modulation index may be determined as a ratio of the amplitude of the reference signal to the amplitude of the carrier signal, for example, the amplitude of a reference sine wave to the amplitude of the triangle carrier signal. However, the modulation index may also be determined as a ratio of the amplitude of the resulting sinusoidal output voltage to the amplitude of the maximum value of the output voltage, for example, a half of the DC-voltage over the input or intermediate circuit capacitor or capacitors 23A, 23B. The determination, or the determined value, of the modulation index may depend on the desired voltage or current waveform, such as, on the magnitude and/or angle of the reference vector REF.

Step or item 120 refers to selecting, based on the determined modulation index, a modulation technique from a plurality of pre-determined modulation techniques. The plurality of pre-determined modulation techniques may include at least two techniques from: Space vector pulse-width modulation (SVPWM), Discontinuous pulse-width modulation minimum ($DPWM_{MIN}$), Discontinuous pulse-width modulation maximum ($DPWM_{MAX}$), symmetric discontinuous pulse-width modulation ($DPWM_{SYM}$).

Step or item 130 refers to modulating an output 16 of the power converter 10 by utilizing the selected modulation technique. According to a preferable embodiment of the present invention, at least two different modulation techniques, that is, a first modulation technique and a second modulation technique, may be utilized at different modulation indices.

"Different modulation techniques" refer herein to either two clearly distinctive modulation techniques, such as SVPWM and $DPWM_{MIN}$, or utilizing only one modulation technique, such as SVPWM, but varying a parameter, characteristic or property thereof based on the modulation index, which may entail, for example, varying the durations of null vectors $V_0$ and $V_7$ with respect to each other at different modulation indices during a switching period.

Method execution is stopped at step or item 199. The method may be performed continuously, repeatedly, intermittently or in desired time intervals.

According to an embodiment of the present invention, the selecting 120 of the modulation technique based on the modulation index from the plurality of pre-determined modulation techniques may comprise selecting the technique that produces a smaller common mode voltage than another technique of the plurality of pre-determined modulation techniques at the modulation index, or advantageously the smallest common mode voltage of the plurality of pre-determined modulation techniques, thus allowing use of an inductor 13 or a choke 13 of a common mode filter 12 of the converter 10 having smaller inductance with respect to an inductance of an inductor or a choke of a common mode filter of a converter utilizing only one modulation technique independent of the modulation index. The use of the smaller inductance is possible since the current creating the magnetic flux in the inductor of the filter is reduced by the reduced common mode voltage when utilizing the method according to an embodiment of the present invention.

According to an embodiment of the present invention, a first modulation index threshold value may be determined, and the modulation technique selected based on comparing the modulation index to the first modulation index threshold value. The first modulation index threshold value may be, for example, 0.5, and the first modulation technique may be selected to be SVPWM, if the modulation index is higher than or equal to first modulation index threshold value. According to an embodiment of the present invention, the modulation technique may be selected to be a first modulation technique, such as SVPWM, if the modulation index is higher than or equal to the first modulation index threshold value, or the modulation technique may be selected to be a second modulation technique, such as $DPWM_{MIN}$ or $DPWM_{MAX}$, if the modulation index is less than the first modulation index threshold value.

According to an embodiment of the present invention, SVPWM technique may be used when the modulation index is above 0.5 and $DPWM_{SYM}$ may be used e.g. above a modulation index of 0.9 to improve the efficiency of the converter.

Alternatively or in addition, a first modulation index threshold value and a second modulation index threshold value may be determined, and the modulation technique may be selected based on the first and the second modulation index threshold values. Furthermore, the modulation technique may be selected to be a first modulation technique, such as $DPWM_{SYM}$, if the modulation index is higher than or equal to the first modulation index threshold value, the modulation technique may be selected to be a second modulation technique, such as SVPWM, if the modulation index is smaller than the first modulation index threshold value and higher than or equal to the second modulation index threshold value, and the modulation technique may be selected to be a third modulation technique, such as DPWM$_{MIN}$ or DPWM$_{MAX}$, if the modulation index is smaller than the second modulation index threshold value. According to one embodiment, the first modulation index threshold value is from range 0.8 to 1.0, advantageously 0.9, and the second modulation index threshold value is from range 0.4 to 0.6, advantageously 0.5. The DPWM$_{SYM}$ may further be used in overmodulation conditions.

Figure 4:
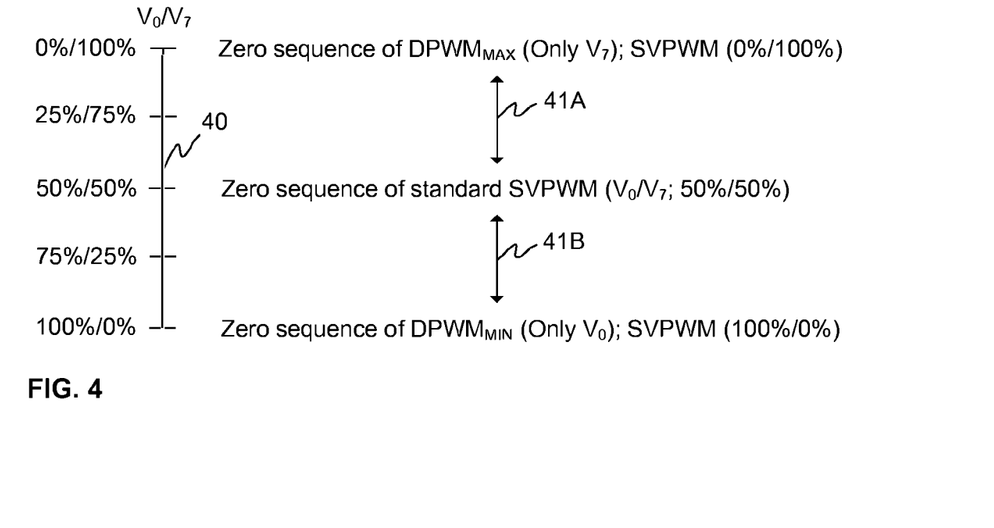
FIG. 4 illustrates schematically portions or durations of negative and positive null vector times or durations of SVPWM with respect to each other according to a method in accordance with an embodiment of the present invention.

According to an embodiment of the present invention, portion or duration of one of negative null vector time or duration and positive null vector time or duration with respect to the other of the positive null vector time or duration and negative null vector time or duration of SVPWM, respectively, may be adjusted based on the modulation index as being illustrated in FIG. 4. In FIG. 4, the portions or durations of negative and positive null vector times with respect to each other, and the relations between them, are illustrated with respect to a line segment 40. Three points on the line segment 40, that is $V_0/V_7$ being 0%/100% corresponding to DPWM$_{MAX}$ technique, $V_0/V_7$ being 50%/50% corresponding to typical standard SVPWM, and $V_0/V_7$ being 100%/0% corresponding to DPWM$_{MIN}$ technique, and $V_0/V_7$ being 25%/75% and $V_0/V_7$ being 75%/25%, are particularly illustrated. However, two-headed arrows 41A and 41B further illustrate that the portions or durations of negative and positive null vector times with respect to each other may be continually chosen, that is to have any combination between the two extremes on the line segment 40.

Furthermore, the output 16 of the power converter 10 may be modulated by utilizing SVPWM having said portions of negative and positive null vector times substantially equal at a first modulation index, and the output 16 of the power converter 10 may be modulated by utilizing SVPWM, wherein said portions of negative null vector time and positive null vector time are adjusted relative to each other as a function of modulation index. This may be performed, for example, by utilizing symmetrical SVPWM, that is having equal durations for $V_0$ and $V_7$ at a modulation index or in a range of modulation indices, and different combinations of durations of $V_0$ and $V_7$ at other modulation indices. As an example, symmetrical SVPWM may be used at modulation index of 0.5 and then the relative duration of $V_0$ with respect to $V_7$ may be gradually increased when moving away from modulation index of 0.5, that is, as illustrated by the arrow 41B in FIG. 4. The duration of $V_0$ with respect to $V_7$ may be, for example, linearly or in non-linear manner, adjusted when moving from modulation index of 0.5 towards modulation index of zero. The adjustment of null vectors' durations with a continuous function of a modulation index facilitates the possible negative effects of a single point modulation strategy change which may occur, for example, when switching from SVPWM to DPWM$_{MIN}$ at a single point of modulation index. Thus, by adjusting null vector durations of SVPWM with modulation index continually, the operation may be more smoothly switched to DPWM$_{MIN}$ or DPWM$_{MAX}$, for instance. The ratio of durations of positive and negative sequence null vector duration during the null vector time period can be freely chosen, for example, in a modulator software run on a controlling unit for each switching period. Therefore, any combination between DPWM$_{MIN/MAX}$ and SVPWM can be used as a function of modulation index. Minimum amount of unbalance between upper 21 and lower 22 controllable switches could be used to achieve the desired reduction of CM component compared to SVPWM.

Alternatively or in addition, the output 16 of the power converter 10 may be modulated by utilizing SVPWM having said portions of negative and positive null vector times substantially equal at a first modulation index, and modulating the output by utilizing DPWM$_{MIN}$ a second modulation index, and modulating the output of the power converter by utilizing DPWM$_{MAX}$ a third modulation index. In addition, said portion of negative null vector time relative to said portion of positive null vector time as a function of modulation index may be gradually increased between the first and the second modulation indices, and said portion of positive null vector time relative to said negative null vector time as a function of modulation index may be gradually increased between the first and the third modulation indices. The gradually increasing of said portion of negative null vector time with respect to said portion of positive null vector time as a function of modulation index may be utilized for decreasing magnetic flux of an inductor or choke of a CM filter or CM+DM filter with respect to solution comprising the use of only symmetrical SVPWM at all modulation indices.

Methods for modulating the output 16 of a power converter 10 according to various embodiments of the present invention may be performed by a controlling unit. The controlling unit may comprise one or more processors, one or more memories being volatile or non-volatile for storing portions of computer program code. The controlling unit may comprise any data values and possibly one or more user interface units. The mentioned elements may be communicatively coupled to each other with e.g. an internal bus. The processor of the controlling unit is at least configured to implement at least some method steps as described hereinabove with respect to FIG. 3, for instance. The controlling unit may be in communication with the controllable switches 21, 22, for example, through gate driver circuits. The controlling unit may also be configured to receive as input measurement data of, for example, input and/or output voltages and/or currents of the converter 10. There may also be other measurements in the system, the measured values of which may be used in the controlling unit for controlling the operation of the converter 10. These may include, for example, voltage and/or current of the intermediate circuit in case the converter is a frequency converter or a part thereof.

The implementation of the method may be achieved by arranging the processor to execute at least some portion of computer program code stored in the memory causing the processor, and thus the controlling unit, to implement one or more method steps as described. The processor is thus arranged to access the memory and retrieve and store any information therefrom and thereto. For sake of clarity, the processor herein refers to any unit suitable for processing information and control the operation of the controlling unit, among other tasks. The operations may also be implemented with a microcontroller solution with embedded software. Similarly, the memory is not limited to a certain type of memory only, but any memory type suitable for storing the described pieces of information may be applied in the context of the present invention. The controlling unit may be arranged integrally to the power converter, that is, in the power converter, or it may be an external controlling unit.

The controlling unit may further comprise a communication interface or interfaces, a port or ports, or connector(s). External units may be connected to the communication interface. External unit may comprise wireless connection or a connection by a wired manner. The communication interface provides interface for communication with external units such as current, voltage and/or power measurement sensors, gate drivers of the semiconductors switches, analog-to-digital (ADC) or digital-to-analog (DAC) converters, auxiliary power sources, such as batteries, etc. There may also be connecting to the external system, such as a laptop or a handheld device, or to a database storing information used in controlling the operation the power converter.

Figure 5:
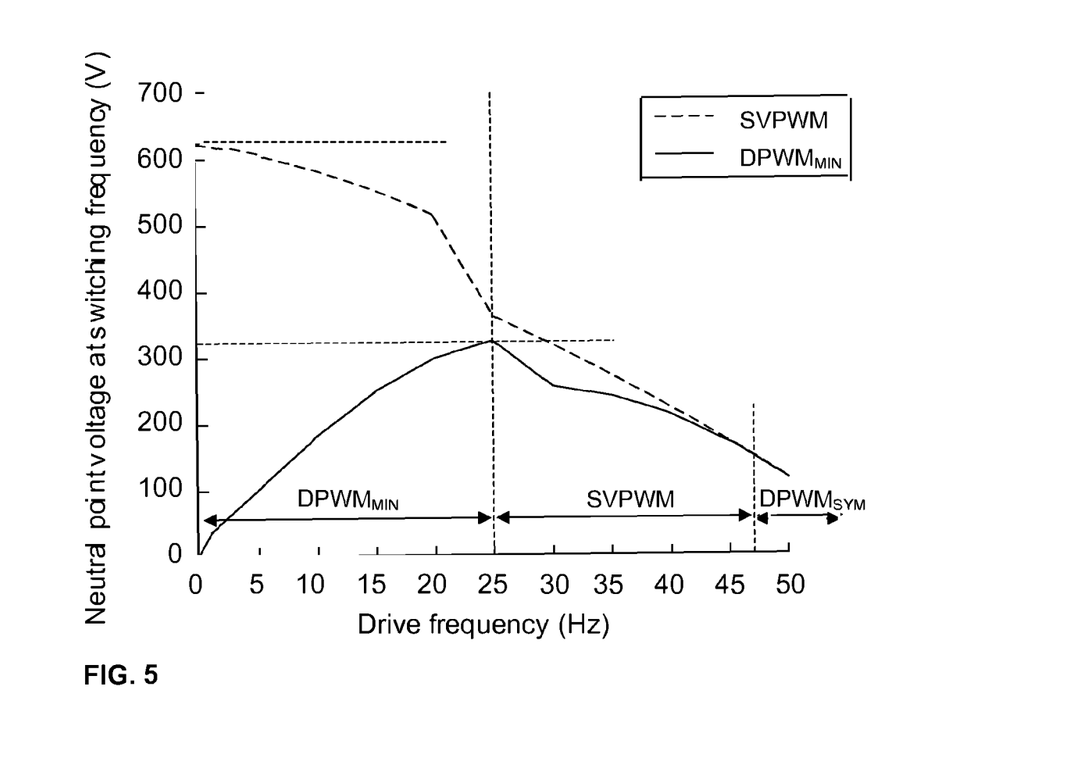
FIG. 5 illustrates schematically neutral point voltage at the switching frequency as a function of output frequency of a power converter according to an embodiment of the present invention.

FIG. 5 illustrates neutral point voltage, i.e. common mode voltage, of a power converter 10 as a function of output frequency of the converter 10 at a switching frequency. The dashed line illustrates the common mode voltage at different output frequencies if SVPWM would be utilized at all modulation indices. Modulation index is 0.5 when drive frequency is 25 Hz in FIG. 5, while modulation index is 1 when drive frequency is 50 Hz. The solid line illustrates the common mode voltage at different output frequencies if $DPWM_{MIN}$ would be utilized at all modulation indices. As can be seen, the common mode voltage is significantly lower for $DPWM_{MIN}$ at modulation indices lower than 0.5. Thus, the common mode voltage can be made smaller and the CM filter smaller and less expensive, if $DPWM_{MIN}$ is being utilized at modulation indices lower than 0.5, although SVPWM would be utilized at other modulation indices. According to an embodiment of the present invention, and also shown in FIG. 5, $DPWM_{SYM}$ may be utilized at modulation indices higher than 0.9, for instance, for improving the efficiency of the converter 10.

Figure 6A:
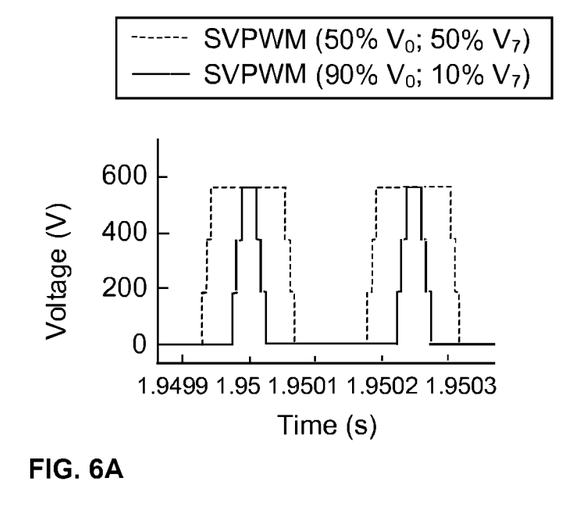
FIGS. 6A and 6B illustrate common mode voltage and virtual flux of the common mode voltage of a power converter according to an embodiment of the present invention.
Figure 6B:
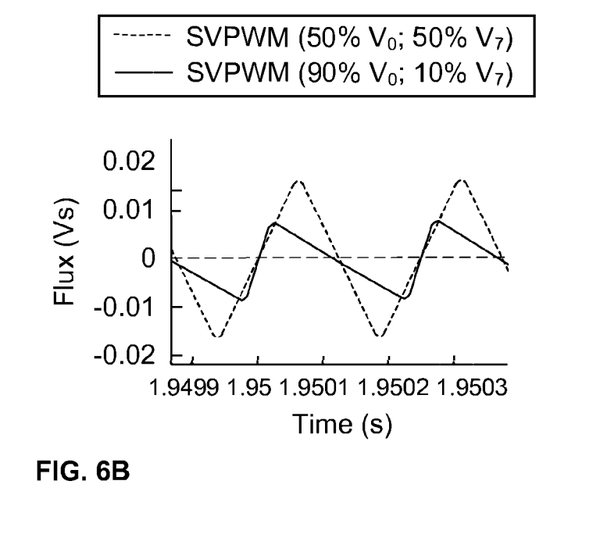

FIGS. 6A and 6B illustrate common mode voltage and virtual flux of the common mode voltage, respectively, of a power converter 10 according to an embodiment of the present invention. The "virtual flux" refers herein to an imaginary current creating magnetic flux in an inductive circuit, wherein said current would have the same waveform and relative amplitude as the virtual flux. FIG. 6A illustrate the effect of adjusting the null vector durations of SVPWM with respect to each other to the common mode voltage. The dashed line represents modulating the converter by symmetrical SVPWM having null vector durations equal with respect to each other in a switching period. The solid line represents modulating the converter by utilizing SVPWM configured or adjusted to utilize 90% of $V_0$ during the null vector time period while utilizing $V_7$ only for 10% of said null vector period. The common mode voltage is shown over two switching periods in relation to negative DC bus with modulation index 0.1. As can be seen, the amplitude of the common mode voltage is the same in both cases, however, the duration is significantly shorter when utilizing SVPWM configured to use $V_0$ for 90% of the null vector time period than in case of symmetrical SVPWM.

FIG. 6B further illustrates the effect of having the common mode voltage duration shorter as illustrated in and described hereinabove with respect to FIG. 6A. FIG. 6B illustrates virtual flux, i.e. volt-seconds, resulting from the common mode voltages of FIG. 6A with DC level removed. FIG. 6B shows an example of how adjusting the ratio of negative and positive null vector durations affects common mode current. In FIG. 6B too, the dashed line represents modulating the output 16 of the converter 10 by symmetrical SVPWM having null vector durations equal with respect to each other in a switching period. The solid line represents modulating the converter by utilizing SVPWM configured to utilize 90% of $V_0$ during the null vector time period while utilizing $V_7$ only for 10% of said null vector period. In case of an inductive circuit, the common mode currents would have the same waveform and relative amplitude as the virtual fluxes of FIG. 6B. It can clearly be seen that the common mode current amplitude can be reduced by modifying the durations of the null vectors with respect to each other.

Significant reduction in the costs of filtering can be achieved by using $DPWM_{MIN,MAX}$ (clamping to either negative or positive DC− rail) at lower modulation indexes than 0.5, as can be seen, for example, in FIG. 5, as the common mode voltage becomes lower with respect to only using symmetrical SVPWM. With this system it is possible to decrease the average volt-seconds to half of the original which means that the average current of the CM inductance can be cut to half of the original. This means that the losses in common mode filter may be reduced up to 75%. Driving pulses of the semiconductor switches 21, 22, such as IGBTs, are in form of pulses, while high level of the pulses conducts higher switches (three upper IGBTs) and low level of the pulses conducts lower switches (three lower IGBTs). So increasing $V_0$ share means to remove a part of higher level of the driving pulses, so the pulses become narrower. The integral of the voltage will determine how much magnetic material is needed in the inductor, in other words, how much current the inductor should withstand without saturating. FIG. 6B shows the peak value of the flux in the inductor. It means there's less common mode current flowing through the CM choke 13, when $V_0$ share is larger and, therefore, the integral of driving pulse is smaller.

Figure 7A:
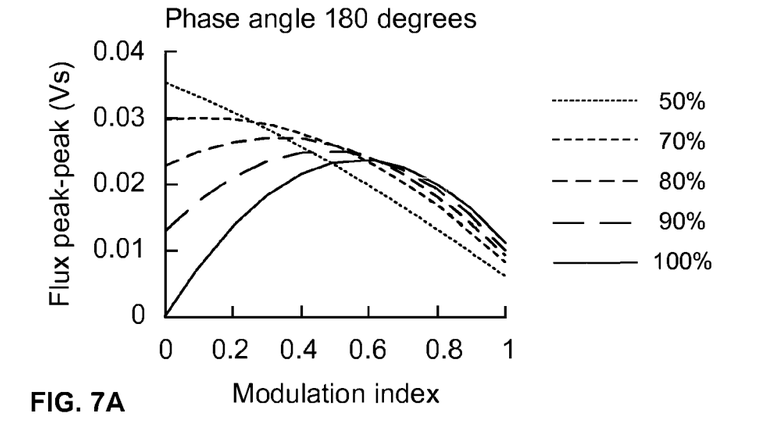
FIGS. 7A-7C illustrate schematically the peak value of virtual flux as a function of modulation index at three phase angles, 180, 90 and 0 degrees, respectively, of a power converter according to an embodiment of the present invention.
Figure 7B:
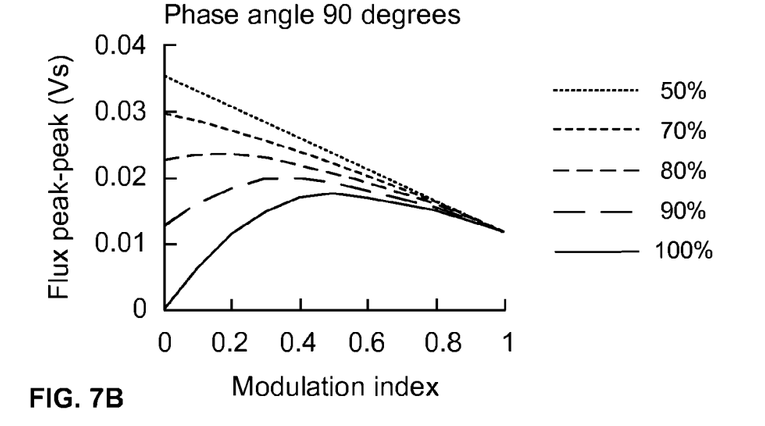
Figure 7C:
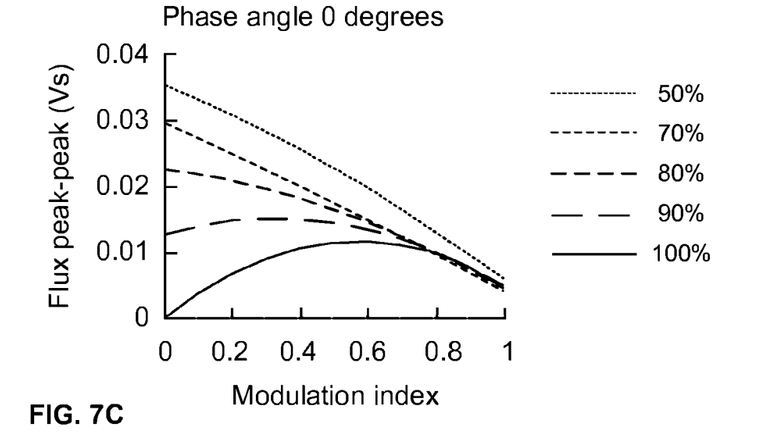

FIGS. 7A-7C illustrate schematically the peak-to-peak value of the flux as a function of modulation index at three phase angles, 180, 90 and 0 degrees, respectively, of a power converter 10 according to an embodiment of the present invention. In FIGS. 7A-7C, the peak-to-peak value of the virtual flux is plotted as a function of modulation index with different ratios of null vector durations (50%, 70%, 80%, 90%, and 100%), that is, the ratio of $V_0$ with respect to the total null vector time period. The peak-to-peak value has been illustrated at different output voltage phase angles in FIGS. 7A-7C in which 180 degrees corresponds to negative peak of the first phase voltage (FIG. 7A), 90 degrees to zero point of the first phase voltage (FIG. 7B) and 0 degrees to positive peak of the first phase voltage (FIG. 7C).

In order to reduce the size of the CM filter 13 and the saturation flux of the inductances, the highest peak of the flux needs to be reduced. Therefore, when looking at FIG. 7A, which shows highest peak-to-peak values of a full output voltage period, the highest peak is at about modulation index 0.5, at which a reduction of about 30% of the flux can be achieved compared to using symmetrical SVPWM at modulation index 0. If considering the losses caused by flux ripple, attention is drawn to average ripple over full output voltage period. In FIGS. 7A-7C, the average ripple can be reduced by about 50%. Losses are relative to the square of current magnitude and, therefore, may be reduced by about 75%.

FIGS. 7A-7C show the peak-to-peak value of the flux as function of the modulation index. By utilizing a method according to an embodiment of the present invention, the maximum stress is around a modulation index of 0.5-0.6. When the modulation index goes below 0.6, a null vector ratio that causes less CM stress than the dashed line corresponding to 50% ratio in in FIGS. 7A-7C may be chosen. Normal SVPWM would cause a stress according to above-mentioned 50% line. In other words, under modulation index of around 0.5, comparing the line representing symmetrical SVPWM (50% $V_0$, 50% $V_7$) to the other lines representing higher ratios of $V_0$. In these other conditions, the peak-to-peak flux further reduces while the proportion of $V_O$ approaches 100%, i.e. approaches $DPWM_{MIN}$. As the flux decreases, so a common mode filter (usually a common mode choke) with smaller inductance can be chosen. A choke with smaller inductance further means smaller volume, less heat generation and lower cost.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

What is claimed is:

1. A method for pulse-width modulation of a power converter, the method comprising:
   determining a modulation index,
   selecting, based on the modulation index, a modulation technique from a plurality of pre-determined modulation techniques,
   modulating an output of the power converter by utilizing the selected modulation technique; and
   adjusting portion of one of negative null vector time and positive null vector time with respect to the other of the positive null vector time and negative null vector time of space vector pulse-width modulation (SVPWM), respectively, based on the modulation index.

2. The method according to claim 1, wherein the power converter is a two-level three-phase inverter.

3. The method according to claim 1, comprising modulating said output by utilizing at least a first modulation technique and a second modulation technique depending on the modulation index.

4. The method according to claim 1, comprising
   determining a first modulation index threshold value, and
   selecting the modulation technique based on comparing the modulation index to the first modulation index threshold value.

5. The method according to claim 1, comprising
   selecting the modulation technique to be a first modulation technique, if the modulation index is higher than or equal to the first modulation index threshold value, or
   selecting the modulation technique to be a second modulation technique, if the modulation index is less than the first modulation index threshold value.

6. The method according to claim 1, wherein the plurality of pre-determined modulation techniques includes at least two techniques from: space vector pulse-width modulation (SVPWM), discontinuous pulse-width modulation minimum ($DPWM_{MIN}$), discontinuous pulse-width modulation maximum ($DPWM_{MAX}$), symmetric discontinuous pulse-width modulation ($DPWM_{SYM}$).

7. The method according to claim 4, comprising
   selecting a space vector pulse-width modulation (SVPWM), if the modulation index is higher than or equal to the first modulation index threshold value, and
   selecting the discontinuous pulse-width modulation minimum ($DPWM_{MIN}$) or the discontinuous pulse-width modulation maximum ($DPWM_{MAX}$), if the modulation index is less than the first modulation index threshold value.

8. The method according to claim 4 wherein the first modulation index threshold value is from 0.4 to 0.6, advantageously 0.5.

9. The method according to claim 1, comprising
   determining a first modulation index threshold value,
   determining a second modulation index threshold value, and
   selecting the modulation technique based on the first and the second modulation index threshold values.

10. The method according to claim 9, wherein the first modulation index threshold value is higher than the second modulation index threshold value, the method comprising
    selecting the modulation technique to be a first modulation technique, if the modulation index is higher than or equal to the first modulation index threshold value,
    selecting the modulation technique to be a second modulation technique, if the modulation index is smaller than the first modulation index threshold value, and higher than or equal to the second modulation index threshold value, and
    selecting the modulation technique to be a third modulation technique, if the modulation index is smaller than the second modulation index threshold value.

11. The method according to claim 10, wherein the first modulation technique is the symmetric discontinuous pulse-width modulation ($DPWM_{SYM}$), the second modulation technique is the space vector pulse-width modulation (SVPWM), and the third modulation technique is the discontinuous pulse-width modulation minimum ($DPWM_{MIN}$) or the discontinuous pulse-width modulation maximum ($DPWM_{MAX}$).

12. The method according to claim 9, wherein the first modulation index threshold value is from range 0.8 to 1.0, advantageously 0.9, and the second modulation index threshold value is from range 0.4 to 0.6, advantageously 0.5.

13. The method according to claim 1, comprising
    modulating said output of the power converter by utilizing space vector pulse-width modulation (SVPWM) having said portions of negative and positive null vector times substantially equal at a first modulation index, and
    modulating said output of the power converter by utilizing space vector pulse-width modulation (SVPWM), wherein said portions of negative null vector time and positive null vector time adjusted relative to each other as a function of modulation index.

14. The method according to claim 1, comprising gradually increasing said portion of negative null vector time with respect to said portion of positive null vector time as a function of modulation index for decreasing magnetic flux of an inductor of a common mode filter, or gradually increasing said portion of positive null vector time with respect to said portion of negative null vector time as a function of modulation index for decreasing magnetic flux of an inductor of a common mode filter.

15. The method according to claim 1, wherein the modulation index is defined as a ratio of the amplitude of the reference signal to the amplitude of the carrier signal.

16. The method according to claim 1, wherein the selecting of the modulation technique based on the modulation index from the plurality of pre-determined modulation techniques comprises selecting the technique that produces a smaller common mode voltage than another technique of the plurality of pre-determined modulation techniques at the modulation index thus allowing the use of an inductor or a choke of a common mode filter of the converter having smaller inductance with respect to an inductance of an inductor or a choke of a common mode filter of a converter utilizing only one modulation technique independent of the modulation index.

17. A power converter, comprising a controlling unit, and an output of the power converter, wherein the controlling unit is configured to perform the method of claim 1.

18. The power converter according to claim 17, where in the power converter is a two-level three-phase inverter, and the output of the power converter is an output voltage.

19. A controlling unit for pulse-width modulation of a power converter, the controlling unit comprising at least one processor, and at least one memory storing at least one portion of computer program code, and wherein the at least one processor is configured to cause the controlling unit to perform the method according to claim 1.

* * * * *